United States Patent Office 2,762,507
Patented Sept. 11, 1956

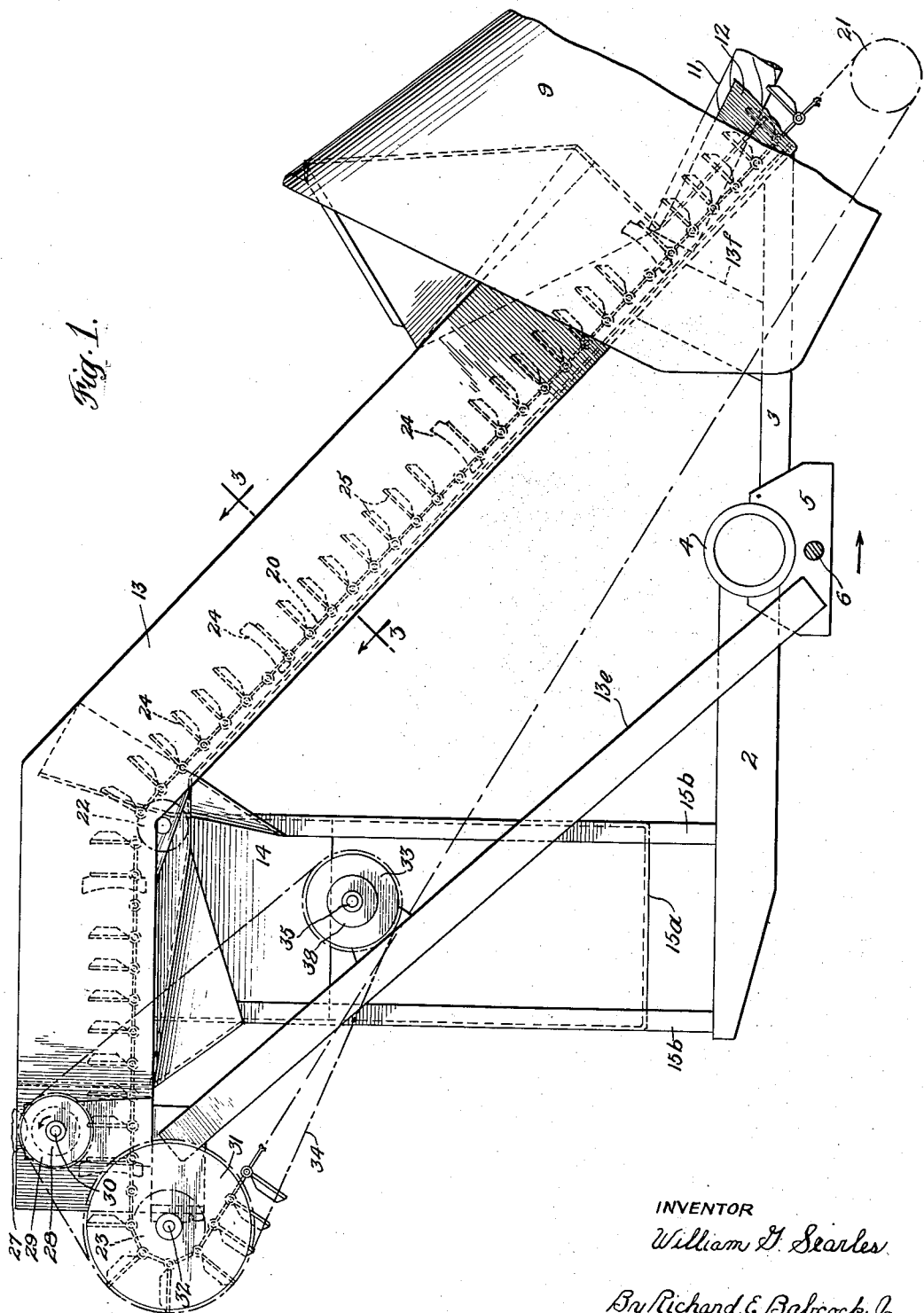

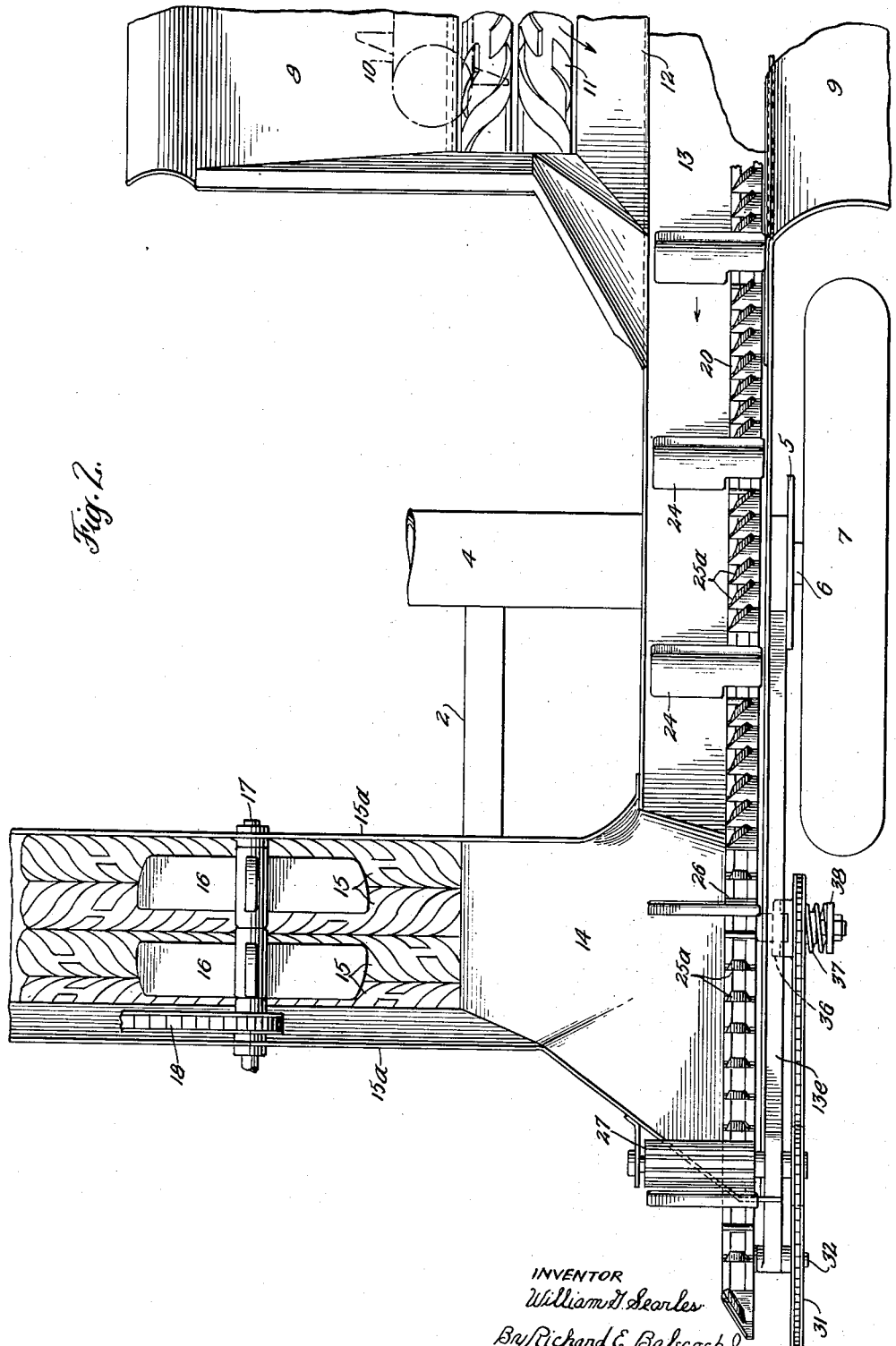

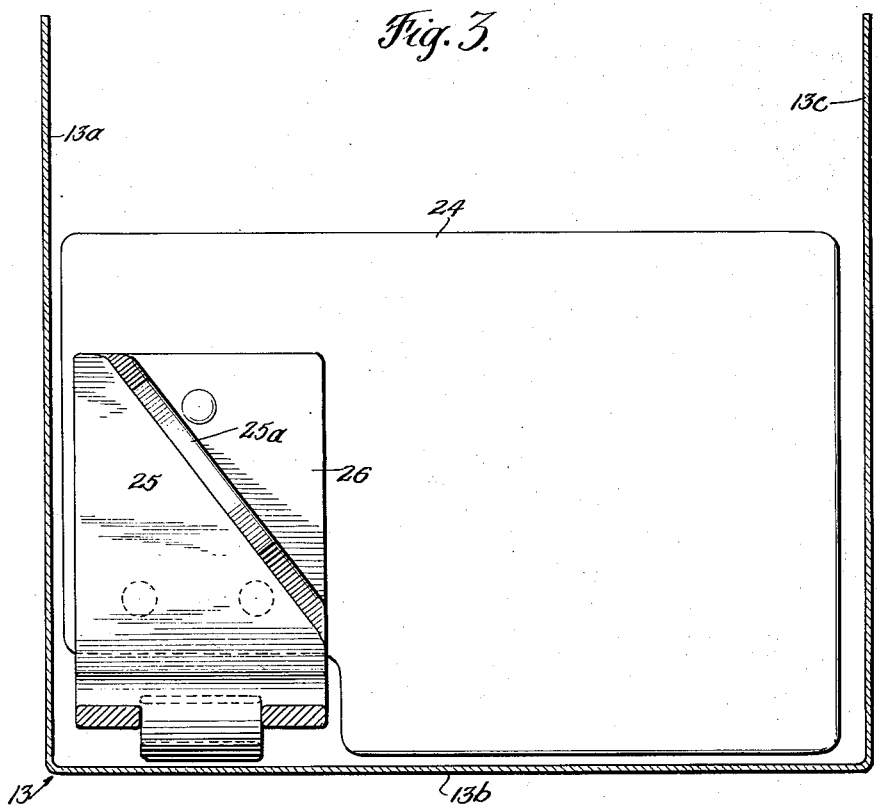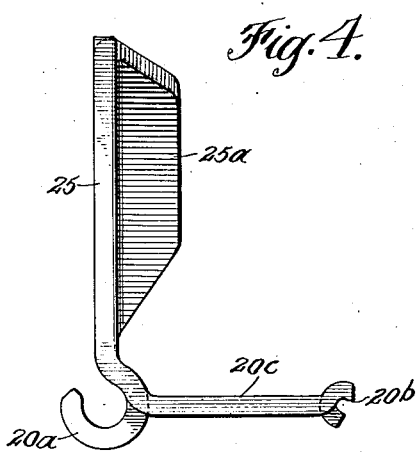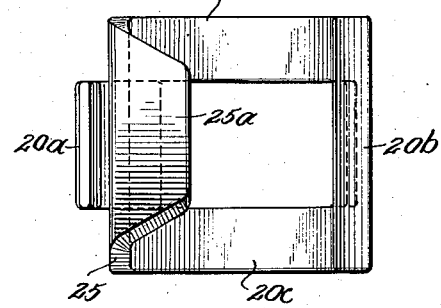

2,762,507

CONVEYING MECHANISM

William G. Searles, New Holland, Pa., assignor, by mesne assignments, to Sperry Rand Corporation, New Holland, Pa., a corporation of Delaware Application April 27, 1953, Serial No. 351,347

3 Claims. (Cl. 209—72)

This invention relates to a conveying mechanism and more particularly to such mechanism which is especially adapted for use in a corn harvesting machine to take the ears of corn from the usual snapping rolls and deliver them to the husking rolls of the harvesting mechanism.

In certain types of corn pickers or harvesters the ears of corn are delivered from the snapping rolls into a trough through which moves an endless conveyor having relatively spaced flights extending across the trough to propel the ears of corn through the trough and to its discharge end where they may be delivered onto a suitable cross-conveyor which takes them to the husking rolls or alternatively may be delivered directly to the husking rolls. In such corn harvesters corn stalks or portions thereof are occasionally delivered to the above mentioned conveying means and it is of course desirable to prevent delivery of these to the husking rolls. To this end in the present invention the operative run of such an endless conveyor moves substantially beyond the discharge end of the trough, the ears of corn being discharged from the trough to the discharge chute or directly to the husking rolls and the corn stalks and portions thereof being carried past the discharge chute and/or husking rolls for endwise discharge at a point remote from the delivery end of said trough.

It is a primary object of the present invention to provide means carried by the conveyor for automatically effecting a transverse discharge of any corn which may be riding thereon at the time the conveyor emerges from the discharge end of the trough and before such ears of corn are carried to the end of the operative run of the conveyor.

It is a further important object to so arrange the conveyor flights relative to the said means that the conveyor flights will support the corn stalks thereon and carry them past the husking rolls, or the cross-conveyor means leading thereto, for discharge at the end of said operative run of the conveyor. Stated otherwise, it is an object of the invention to so construct and arrange the flexible conveyor element that it will automatically function to discharge the ears of corn and the corn stalks respectively at separate discharge points, the ears of corn being discharged transversely from said flexible conveyor and the stalks being discharged in the direction of movement thereof.

It is a further object to provide means for removing any ears of corn from the stalks carried by the conveyor mechanism and to deliver these to the husker rolls while discharging the stalks at the end of the flexible conveyor.

The foregoing and other incidental objects and advantages are all attained by the preferred embodiment of my invention illustrated in the accompanying drawings in which:

Figure 1 represents a side elevational view of a corn picker embodying an application of the invention;

Figure 2, a plan view of the mechanism shown in Figure 1;

Figure 3, an enlarged cross-section taken on the line 3—3 of Figure 1;

Figure 4, a side view of one of the links of the conveyor chain employed in the preferred embodiment of the invention; and Figure 5, a plan view of the link of Figure 4.

Referring now in detail to the accompanying drawings the corn picker or harvester shown therein is of the type which is adapted to be drawn down the rows of corn by a tractor or other vehicle in the direction indicated by the arrow in Figure 1. The main frame of the harvester includes the generally horizontal members 2 and 3 respectively supported from the main cross-piece 4 having a depending web 5 thereon which supports the axle 6 on which is rotatably journalled the wheel 7 as shown in Figure 2. Only one such wheel is shown in the accompanying drawings, though it will be understood that a similar wheel 7 is similarly mounted at the opposite end of the cross-piece 4.

Supported at the forward end of this frame are a pair of usual transversely spaced gathering members 8 and 9 respectively disposed to pass on opposite sides of a row of corn, these being preferably provided with usual gathering chains 10 such as indicated in Figure 2 to urge the corn stalks rearwardly between conventional snapping rolls 11—11'. The roll 11' is disposed with its axis at a substantially higher level than the roll 11 so that the ears of corn, once freed from their stalks, will pass by gravity over the roll 11 for delivery down the inclined chute 12 into the conveyor trough 13. It will be seen that trough 13 is supported above the main frame by diagonal braces 13e and 13f. This trough slopes upwardly as shown in Figure 1 whereby the ears of corn conveyed therethrough may be elevated a substantial distance above the husking rolls. The discharge end or upper end of the said trough is disposed to deliver the ears of corn to a suitable cross-conveyor which may conveniently assume the form of a chute 14 which slopes transversely from the discharge end of the trough 13 downwardly to the husker rolls 15 to deliver the ears of corn to said rolls. The rolls 15 may be of conventional construction and arrangement, disposed in an upwardly opening housing 15a supported on upright frame members 15b and driven in usual manner. If desired, usual beater or presser elements 16 may be mounted in the housing 15a on shaft 17 for rotation above the said rolls 15 to urge the ears of corn into operative engagement with said rolls and thereby improve the husking action of the rolls. The shaft 17 and elements 16 may be rotated through a chain drive 18 from any suitable source. It will be understood that once the ears of corn have been husked by the operation of the rolls 15, they may be elevated to an accompanying vehicle by elevating and conveying means which are of purely conventional arrangement, hence are not shown in the accompanying drawings.

As is shown in Figure 3, the trough 13 may be of U-shaped cross-section having a flat bottom 13b and relatively spaced vertical sides 13a and 13b respectively.

In order to propel the ears of corn upwardly through the trough 13 there is provided a flexible endless conveyor 20 which may be of the chain type supported around rotatably mounted sprockets 21, 22, and 23 respectively with its operative run between the sprockets 21 and 22 moving upwardly through said trough closely adjacent one side 13a thereof and just above the bottom 13b of the trough. It will be noted that the horizontal portion of conveyor 20 extending between the sprockets 22 and 23 extends completely across and over the cross-conveyor or chute 14.

Carried by the flexible conveyor 20 are a plurality of relatively spaced conveyor flights 24 which substantially completely occupy the cross-section of the bottom portion at least of said trough. To this end the side and bottom edges of the respective flights 24 are preferably parallel and closely adjacent to the respective sides 13a and 13c and the bottom 13b respectively of the trough. It will frequently happen in the use of the machine that stalks of corn will be pulled loose by the snapping rolls and delivered into the trough 13. In such case it is desired to avoid delivering the said stalks into the chute 14 and accordingly the upper edges of the flights 24 will preferably extend substantially horizontally as shown so that the stalks will be jointly supported on the upper edges of several adjoining flights 24 and will be delivered in an endwise direction by said flights and carried completely over the cross-conveyor chute 14 without rolling or moving transversely from said flights into the chute. It will be seen that such stalks will be discharged from the conveyor 20 as the latter passes around the terminal sprocket 23. The conveyor flights 24 will of course be spaced apart a distance greater than the maximum length of any of the ears of corn which might be handled by the conveyor so that the ears of corn will ride along in the trough 13 between these respective conveyor flights 24. Inasmuch as the conveyor 20 is moving over the bottom of the trough 13 and necessarily occupies a certain proportion of the width of the trough, in the absence of any provisions to the contrary, it will be seen that some ears of corn may be crowded onto the conveyor chain 20 to ride thereon across the chute 14 and be discharged from the said conveyor together with the corn stalks as the chain 20 passes around the terminal sprocket 23. In order to avoid such difficulty, I provide automatic means for enabling the chain or conveyor 20 to clear itself of such ears of corn as the conveyor 20 moves above such chute. To this end the conveyor 20 is provided between each pair of adjoining flights 24 with a plurality of article dislodging elements 25 preferably carried by certain of the individual links of the conveyor chain. Each such element 25 is formed in any suitable manner to provide an upwardly presented inclined surface 25a sloping downwardly transversely to said flexible conveyor 20 to discharge ears of corn transversely of the flexible conveyor either into the trough 13 or the cross-conveyor chute 14. Thus it will be seen that certain of the links of the chain 20 will function to automatically clear the chain as same passes over the chute 14, hence these chain links and the chain itself may be said to be self-clearing as regards the ears of corn thereon.

Inasmuch as the inclined surfaces 25a of the dislodging elements 25 will preferably be disposed at levels below the upper edges of the flights 24, the said elements 25 will not contact or in any way effect the corn stalks supported across the upper edges of said flights 24. Thus it will be seen that the conveyor 20 of the invention is capable of efficiently separating the ears of corn from the stalks on said conveyor by discharging the ears of corn transversely before the said ears are carried to the end of the operative run of the conveyor, while permitting the stalks to remain on the flights 24 and be carried thereby to the end of the operative run of the conveyor for discharge rearwardly over the terminal sprocket 23.

Each of the self-clearing links of the chain 20 comprises a hook-end 20a, a pintle end 20b, these ends being connected by the side bars 20c, and the chain clearing or article dislodging element 25 preferably having the sloping flange 25a thereon. Except as to the specific shape of the elements 25 these self-clearing links may be formed substantially in the manner disclosed in the U. S. patent to Korra No. 2,527,938, granted October 31, 1950. The several flight supporting links of the chain 20 may be of conventional construction generally similar to that of the self-clearing links above mentioned, except that in place of the element 25, each of said flight supporting links is provided with a flat flight supporting member 26 to which the respective flights 21 may be riveted or otherwise secured as indicated in Figure 3.

All of the chain links, including both the self-clearing links and the flight supporting links are assembled in usual manner, with the pintle end 20b of each link received in the hook end 20a of its adjoining link.

Where cornstalks are broken off and delivered up the trough 13 the ears of corn will generally remain attached to these stalks. In view of the desirability of recovering such ears of corn it may be found desirable to provide a pair of more or less conventional auxiliary snapping rolls 27—28 (see Figures 1 and 2) located above and near the discharge end of the conveyor 20 with the mouth or opening between said rolls disposed approximately in alignment with the sloping or inclined section of the conveyor 20. With such arrangement it will be seen that the corn stalks will be directed between these rolls and the ears of corn will be snapped off of the stalks by the pressure of the rolls, whereupon the stalks will drop back onto the conveyor 20 after passing through the rolls and will be discharged from the conveyor 20 as the latter passes around the terminal sprocket 23.

The conveyor 20 and auxiliary snapping rolls 27—28 may be conventionally driven, the drive means shown in Figures 1 and 2 comprising a driven sprocket 29 keyed on the shaft 30 of the lower roll 28, and a driven sprocket 31 keyed on the shaft 32 which supports the terminal sprocket 23, these driven sprockets 29 and 31 being driven from a drive sprocket 33 by means of a usual sprocket chain 34. The drive sprocket 33 is mounted on a shaft 35 which may be powered from any suitable source and is preferably releasably connected to said shaft 35 by means of a conventional dog clutch 36, one of the members of said clutch being fixed to the drive sprocket 33 and the latter being splined on the shaft 35 for axial movement. A spring 37 under compression between the sprocket 33 and a washer 38 fixed on the shaft 35 normally urges the sprocket 33 in a direction to maintain the members of the clutch 36 in operative driving engagement. Disengaging movement of the sprocket 33 and its associated clutch member against the pressure of spring 37 may be manually produced whenever desired by any usual means (not shown).

In the overall operation of the invention, as the machine moves down a row of corn in the direction indicated by the arrow in Figure 1, the corn stalks will be successively received between the snapping rolls 11—11', which will remove the ears of corn from the majority of the stalks and deliver these down the chute 12 into the lower end of the trough 13, where the ears of corn will normally fall between the conveyor flights 24. Such ears of corn as may be received on the conveyor chain 20 will normally be urged by gravity off of said chain and to the bottom of the trough 13 by the inclined surfaces 25a of the dislodging elements 25. The upwardly moving conveyor flights 24 will propel the ears of corn up the trough 13 and deliver them to the transversely downwardly sloping chute 14. In the event any ears of corn are crowded onto the dislodging or self-clearing elements 25, the crowding pressure will be relieved by delivery of the other ears into the chute 14, and the ears which have thus been forced to ride on the inclined surfaces 25a will be discharged by gravity in a direction transversely of the movement of the conveyor 20 into the trough 14. All such ears of corn delivered into the trough 14 will slide down the inclined bottom thereof onto the husking rolls 15 and will be acted on by the husking rolls 15 and presser elements 16 in usual manner to remove the husks from the ears of corn.

Such stalks of corn or portions thereof as may be delivered into the trough 13 will obviously be caused by the sides of the trough to move in an endwise direction through the trough. These stalks will of course be supported across the upper edges of a plurality of the conveyor flights 24 and will be carried by such flights 24 completely across the chute 14. Where the auxiliary snapping rolls or extractors 27 and 28 are provided such stalks will be directed between these and thence will fall back onto the conveyor flights 24 for discharge over the sprocket 23. As the stalks pass through these rolls 27 and 28 the ears of corn thereon are snapped off to fall back into the trough 14, which it will be noted extends beneath the rolls 27 and 28. Such ears falling into the chute 14 will of course be delivered into the husking rolls 15 together with the other ears of corn.

It will thus be noted that the conveyor element 20 of the invention is so constructed and arranged as to achieve a definite self-clearing function; also, that the arrangement of the trough 13, the conveyor 20 with its dislodging surfaces 25a, and the conveyor flights 24 is such as to achieve a very efficient separation of the ears of corn from the corn stalks and other trash which may be carried on the upper edges of the flights 24, whereby the stalks and trash may be discharged in an endwise direction while the ears of corn are discharged transversely relative to the movement of the conveyor 20.

In this application, I have shown and described only the preferred embodiment of my invention simply by way of illustration of the preferred mode contemplated by me of carrying out my invention, as by law required. However, I recognize that my invention is capable of other and different embodiments and that its several details may be altered in various ways. Accordingly, it is to be understood that the foregoing drawings and description are merely illustrative in nature.

Having thus described my invention, I claim:

1. Conveying means comprising a trough having a bottom and opposed side walls, a flexible conveyor element moveable through said trough adjacent one of said side walls, a discharge chute communicating with said trough on the side thereof remote from said one side wall, a plurality of relatively spaced conveyor flights carried by said conveyor element and adapted to push articles of a length less than the space between adjacent flights through said trough, said flights substantially completely occupying the full width of said trough, and a plurality of article dislodging members carried by said conveyor element between each pair of adjacent flights, each of said members having an upwardly presented surface inclined downwardly away from said one side wall, said inclined surface having an upper end terminating closely to said one side wall to preclude the lodging of articles between said one side wall and the dislodging member, whereby when conveyed articles reach said discharge chute the articles riding on said dislodging members are discharged laterally therefrom by gravity and into said chute.

2. Conveying means comprising a trough having a bottom and opposed side walls, a flexible conveyor element moveable through said trough adjacent one of said side walls, a discharge chute communicating with said trough on the side thereof remote from said one side wall, a plurality of relatively spaced conveyor flights carried by said conveyor element and adapted to push articles of a length less than the space between adjacent flights through said trough, said flights substantially completely occupying the full width of said trough and having generally horizontal upper edges disposed to jointly support and convey other articles of a length greater than the space between adjacent flights, and a plurality of article dislodging members carried by said conveyor element between each pair of adjacent flights, each of said members having an upwardly presented surface inclined downwardly away from said one side wall, said inclined surface having an upper end terminating closely to said one side wall to preclude the lodging of articles between said one side wall and the dislodging member, whereby when conveyed articles reach said chute the shorter articles riding on said dislodging elements are discharged laterally by gravity and into the chute, and the longer articles are conveyed past the chute and then discharged from the conveying means in its direction of movement.

3. Conveying means comprising a trough having a bottom and opposed side walls, a flexible conveyor element moveable through said trough adjacent one of said side walls, a discharge chute communicating with said trough on the side thereof remote from said one side wall, a plurality of relatively spaced conveyor flights carried by said conveyor element and adapted to push articles of a length less than the space between adjacent flights through said trough, said flights substantially completely occupying the full width of said trough and having generally horizontal upper edges disposed to jointly support and convey other articles of a length greater than the space between adjacent flights, and a plurality of article dislodging members carried by said conveyor element between each pair of adjacent flights, said dislodging members projecting upwardly from said flexible conveyor element to a less extent than said conveyor flights, each of said members having an upwardly presented surface inclined downwardly away from said one side wall, said inclined surface having an upper end terminating closely to said one side wall to preclude the lodging of articles between said one side wall and the dislodging member, whereby when conveyed articles reach said chute the shorter articles riding on said dislodging elements are discharged laterally by gravity and into the chute, and the longer articles are conveyed past the chute and then discharged from the conveying means in its direction of movement.

References Cited in the file of this patent

UNITED STATES PATENTS

| 285,664   | Pearce         | Sept. 25, 1883 |
| 1,885,946 | Redler         | Nov. 1, 1932   |
| 1,999,484 | De Los Sinden  | Apr. 30, 1935  |
| 2,527,938 | Korra          | Oct. 31, 1950  |
| 2,630,207 | Joy            | Mar. 3, 1953   |

FOREIGN PATENTS

| 629,844 | Germany | May 14, 1936 |